United States Patent [19]

Imanishi

[11] Patent Number: 5,974,055
[45] Date of Patent: Oct. 26, 1999

[54] DATA MULTIPLEXING AND DEMULTIPLEXING APPARATUS CAPABLE OF SIMPLIFYING HARDWARE WITHOUT REDUCING FLEXIBILITY

[75] Inventor: Masayuki Imanishi, Tokyo, Japan

[73] Assignee: NEC Corporation, Tokyo, Japan

[21] Appl. No.: 08/975,701

[22] Filed: Nov. 21, 1997

[30] Foreign Application Priority Data

Nov. 22, 1996 [JP] Japan ..................................... 8-327861

[51] Int. Cl.$^6$ .................................. H04J 3/06; H04J 3/04
[52] U.S. Cl. ........................... 370/503; 370/535; 370/537; 370/542; 395/891; 341/100; 341/101
[58] Field of Search ...................................... 370/366–368, 370/476, 503, 505, 506, 535, 536, 537, 542; 341/100, 101; 395/310, 309, 885, 891

[56] References Cited

U.S. PATENT DOCUMENTS

| | | | |
|---|---|---|---|
| 3,872,257 | 3/1975 | Bleickardt et al. | 370/506 |
| 4,035,580 | 7/1977 | Dieter et al. | 370/503 |
| 4,977,558 | 12/1990 | Iguchi et al. | 370/542 |
| 5,483,539 | 1/1996 | Kaufmann | 370/509 |
| 5,537,148 | 7/1996 | Fujinami | 348/473 |
| 5,623,493 | 4/1997 | Kagemoto | 370/397 |

*Primary Examiner*—Douglas W. Olms
*Assistant Examiner*—Seema S. Rao
*Attorney, Agent, or Firm*—Whitham, Curtis & Whitham

[57] ABSTRACT

In a data multiplexing/demultiplexing apparatus including a serial-to-parallel converter, a microprocessor and a memory, a data shift register inputs data from the memory by way of the microprocessor, a correction register stores a shift correction amount on a transmission path of the data shift register. A framing rule register stores a framing rule determined by the microprocessor, a counter, carries out a counting operation in accordance with the framing rule to an address information signal. A look-up table ROM outputs a selector selection signal in accordance with the address information signal, and a data selector distributes output data of the data shift register among a plurality of shift registers in accordance with the selector selection signal. The microprocessor analyzes data separated by the plurality of shift registers, performs a synchronism detecting operation and a protocol determining operation, and determines the framing rule.

4 Claims, 16 Drawing Sheets

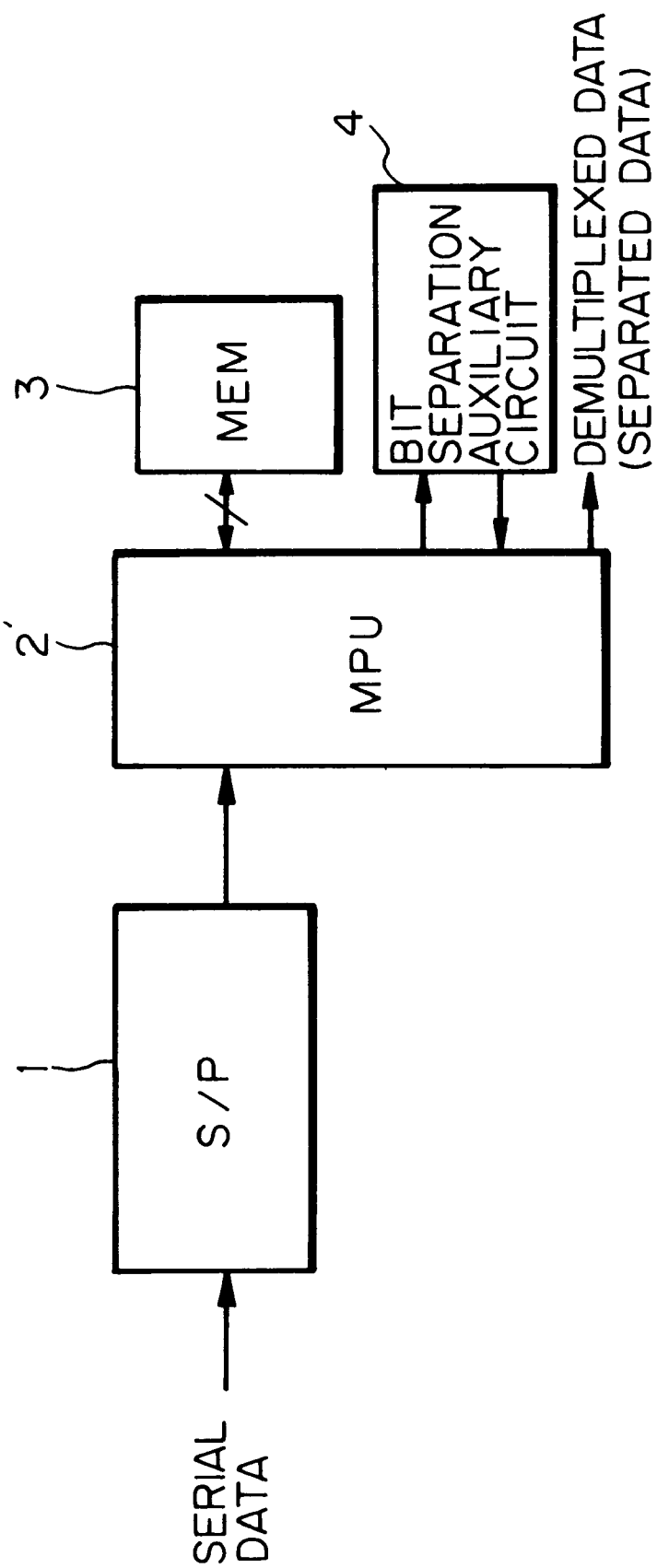

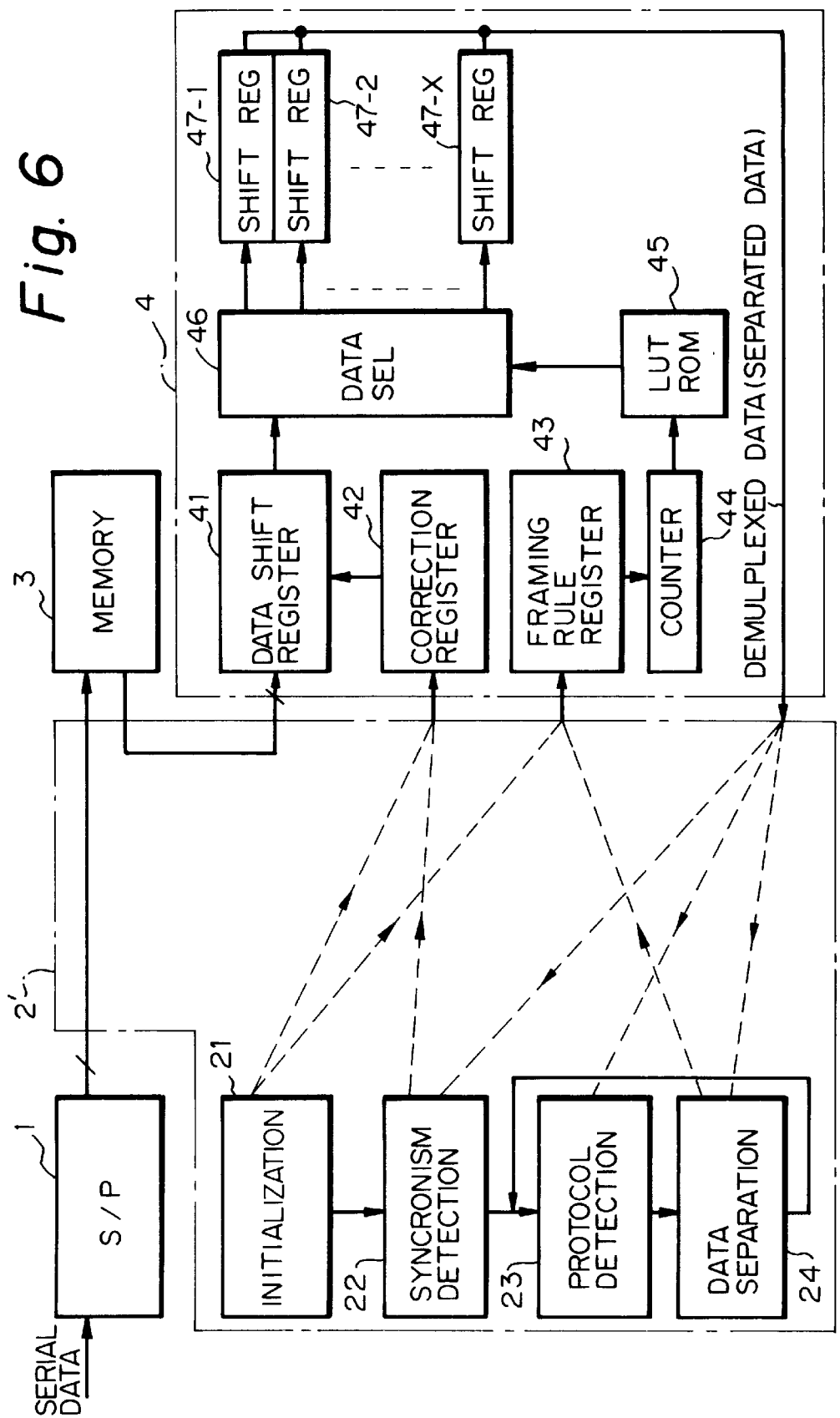

Fig. 7A

INITIAL CHANNEL

| 1 | 2 | 3 | 4 | 5 | 6 | 7 | 8 |
|---|---|---|---|---|---|---|---|
| A1 | A2 | A3 | A4 | A5 | A6 | V1 | FAS |
| A1 | A2 | A3 | A4 | A5 | A6 | V9 | |
| A1 | A2 | A3 | A4 | A5 | A6 | | BAS |
| A1 | A2 | A3 | A4 | A5 | A6 | V121 | V130 |
| | | | | | | | V240 |
| | | | | | | | L1 L12 |
| A1 | A2 | A3 | A4 | A5 | A6 | V708 | M1 M40 |

Fig. 7B

SECOND CHANNEL

| 1 | 2 | 3 | 4 | 5 | 6 | 7 | 8 |
|---|---|---|---|---|---|---|---|
| V2 | V3 | V4 | V5 | V6 | V7 | V8 | FAS |
| V10 | | | | | | V16 | |
| | | | | | | | BAS |
| | | | | | | V128 | V138 |
| V41 | | | | | | V137 | V248 |
| | | | | | | V247 | |
| | | | | | | | V716 |

Fig. 8A

INITIAL CHANNEL

| 1 | 2 | 3 | 4 | 5 | 6 | 7 | 8 |
|---|---|---|---|---|---|---|---|
| A1 | A2 | V1 | V2 | V3 | V4 | V5 | FAS |
| A1 | A2 | V13 | V14 | V15 | V16 | V17 | BAS |
| A1 | A2 | V181 | V182 | V183 | V184 | V185 | V198 |
| A1 | A2 | V193 | | | | V197 | |
| | | | | | | | L1 |
| | | | | | | | L12 |
| | | | | | | | M1 |
| A1 | A2 | | | | | | M40 |

Fig. 8B

SECOND CHANNEL

| 1 | 2 | 3 | 4 | 5 | 6 | 7 | 8 |
|---|---|---|---|---|---|---|---|
| V6 | V7 | V8 | V9 | V10 | V11 | V12 | FAS |
| V18 | V19 | V20 | V21 | V22 | V23 | V24 | BAS |
| V199 | | | | | | V192 | |

Fig. 9

| | TYPE | D7 | D6 | D5 | D4 | D3 | D2 | D1 | D0 |
|---|---|---|---|---|---|---|---|---|---|
| G.728 | 1 | A1 | A2 | V1 | V2 | V3 | V4 | V5 | FAS |
| | 2 | A1 | A2 | V1 | V2 | V3 | V4 | V5 | BAS |
| | 3 | A1 | A2 | V1 | V2 | V3 | V4 | LSD1 | LSD2 |
| | 4 | A1 | A2 | V1 | V2 | V3 | V4 | LSD | MLP |
| | 5 | A1 | A2 | V1 | V2 | V3 | V4 | V5 | MLP |
| | 6 | A1 | A2 | V1 | V2 | V3 | V4 | V5 | V6 |
| | 7 | V1 | V2 | V3 | V4 | V5 | V6 | V7 | FAS |
| | 8 | V1 | V2 | V3 | V4 | V5 | V6 | V7 | BAS |
| | 9 | V1 | V2 | V3 | V4 | V5 | V6 | V7 | V8 |
| G.722 | 10 | A1 | A2 | A3 | A4 | A5 | A6 | V1 | FAS |
| | 11 | A1 | A2 | A3 | A4 | A5 | A6 | V1 | BAS |
| | 12 | A1 | A2 | A3 | A4 | A5 | A6 | V1 | V2 |
| | 13 | A1 | A2 | A3 | A4 | A5 | A6 | LSD1 | LSD2 |
| | 14 | A1 | A2 | A3 | A4 | A5 | A6 | V1 | LSD |
| | 15 | A1 | A2 | A3 | A4 | A5 | A6 | V1 | MLP |
| | 16 | V1 | V2 | V3 | V4 | V5 | V6 | V7 | FAS |
| | 17 | V1 | V2 | V3 | V4 | V5 | V6 | V7 | BAS |
| | 18 | V1 | V2 | V3 | V4 | V5 | V6 | V7 | V8 |
| G.711 | 19 | A1 | A2 | A3 | A4 | A5 | A6 | A7 | FAS |
| | 20 | A1 | A2 | A3 | A4 | A5 | A6 | A7 | BAS |
| | 21 | A1 | A2 | A3 | A4 | A5 | A6 | A7 | V1 |
| | 22 | A1 | A2 | A3 | A4 | A5 | A6 | A7 | LSD |
| | 23 | A1 | A2 | A3 | A4 | A5 | A6 | A7 | MLP |
| | 24 | V1 | V2 | V3 | V4 | V5 | V6 | V7 | FAS |
| | 25 | V1 | V2 | V3 | V4 | V5 | V6 | V7 | BAS |
| | 26 | V1 | V2 | V3 | V4 | V5 | V6 | V7 | V8 |

Fig. 10

| | TYPE | D7 | D6 | D5 | D4 | D3 | D2 | D1 | D0 |
|---|---|---|---|---|---|---|---|---|---|
| G.728 | A | S1 | | VIDEO | | | | | S2 |
| G.728 | B | S1 | | VIDEO | | | | S2 | |
| G.728 | C | S1 | | VIDEO | | | | S2 | S3 |
| G.722 | D | AUDIO | | | | | | S2 | |
| G.722 | E | AUDIO | | | | | | S2 | S3 |
| G.711 | F | AUDIO | | | | | | | S2 |

Fig. 11

| TYPE | D7 | D6 | D5 | D4 | D3 | D2 | D1 | D0 | |
|------|----|----|----|----|----|----|----|----|----|
| G | | | | VIDEO | | | | | S4 |
| H | | | | VIDEO | | | | | |

DATA MULTIPLEXING AND DEMULTIPLEXING APPARATUS CAPABLE OF SIMPLIFYING HARDWARE WITHOUT REDUCING FLEXIBILITY

BACKGROUND OF THE INVENTION

1. Field of the Invention

The present invention relates to a data multiplexing and demultiplexing apparatus used in synchronous telecommunications.

2. Description of the Related Art

In the field of synchronous telecommunications systems such as an integrated services digital network (ISDN), synchronization bits and actual data are multiplexed for transmission. With data multiplexing-demultiplexing systems such as International Telecommunication Union (ITU) Standards H. 221 and H.223, data including synchronization data, audio data, video data and other data are multiplexed at a transmitter side and transmitted by way of one or more than one digital channels. At a receiver side, the multiplexed data are received and demultiplexed (separated) from each other according to the multiplexing system used at the transmitter side before they are distributed to respective decoding units for decoding the data.

A first prior art multiplexing and demultiplexing apparatus is constructed mainly by hardware (see: JP-A-4-207728). This will be explained later in detail.

In the first prior art multiplexing and demultiplexing apparatus, however, the protocol processing units have to be hierarchically configured. As a result, the hardware inevitably will become bulky. Additionally, if a new framing pattern is assigned, an extra state transition has to be added to a state machine, so that the time for responding a new protocol has to be modified to a large extent, and a number of work steps required for this modification will be by far longer.

A second prior art data multiplexing and demultiplexing apparatus is constructed mainly by software. This will also be explained later in detail.

The second prior art multiplexing and demultiplexing apparatus, however, is accompanied by the problem of involving many instruction cycles, which requires a highly efficient processor.

SUMMARY OF THE INVENTION

It is an object of the present invention to provide a data multiplexing and demultiplexing apparatus capable of simplifying hardware without reducing the flexibility.

According to the present invention, in a data multiplexing/demultiplexing apparatus including a serial-to-parallel converter, a microprocessor and a memory, a data shift register inputs data from the memory by way of the microprocessor, a correction register stores a shift correction amount on a transmission path of the data shift register. A framing rule register stores a framing rule determined by the microprocessor, a counter, carries out a counting operation in accordance with the framing rule to an address information signal. A look-up table ROM outputs a selector selection signal in accordance with the address information signal, and a data selector distributes output data of the data shift register among a plurality of shift registers in accordance with the selector selection signal. The microprocessor analyzes data separated by the plurality of shift registers, performs a synchronism detecting operation and a protocol determining operation, and determines the framing rule.

The data multiplexing and demultiplexing apparatus according to the present invention has a simplified configuration in terms of both hardware and software. Also, the microprocessor of the present invention processes sophisticated protocols so that it can adapt itself to new protocols by only modifying the software it contains. This will provide a remarkably improved productivity.

Further, the performance-related requirements imposed on the microprocessor can be reduced in comparison with the second prior art apparatus realized only by means of software. This will be effective to simplify the related systems.

BRIEF DESCRIPTION OF THE DRAWINGS

The present invention will be more clearly understood from the description as set forth below, in comparison with the prior art, with reference to the accompanying drawings, wherein:

FIG. 5 is a block circuit diagram illustrating an embodiment of the data demultiplexing apparatus according to the present invention;

FIG. 6 is a detailed block circuit diagram of the bit. separation auxiliary circuit of FIG. 5;

FIGS. 7A, 7B, 8A and 8B are tables showing bit arrangement examples according to the H.221 Standard;

FIG. 9 is a table showing bit patterns of the 23 initial channel according to the H. 221 Standard;

FIG. 10 is a table showing types of bit patterns of the 2B initial channel according to H. 221 Standard;

FIG. 11 is a table showing types of bit patterns of the 2B second channel according to the H. 221 Standard;

DESCRIPTION OF THE PREFERRED EMBODIMENTS

Before the description of the preferred embodiments, prior art data demultiplexing apparatuses will be explained with reference to FIGS. 1, 2, 3 and 4.

Figure 1:
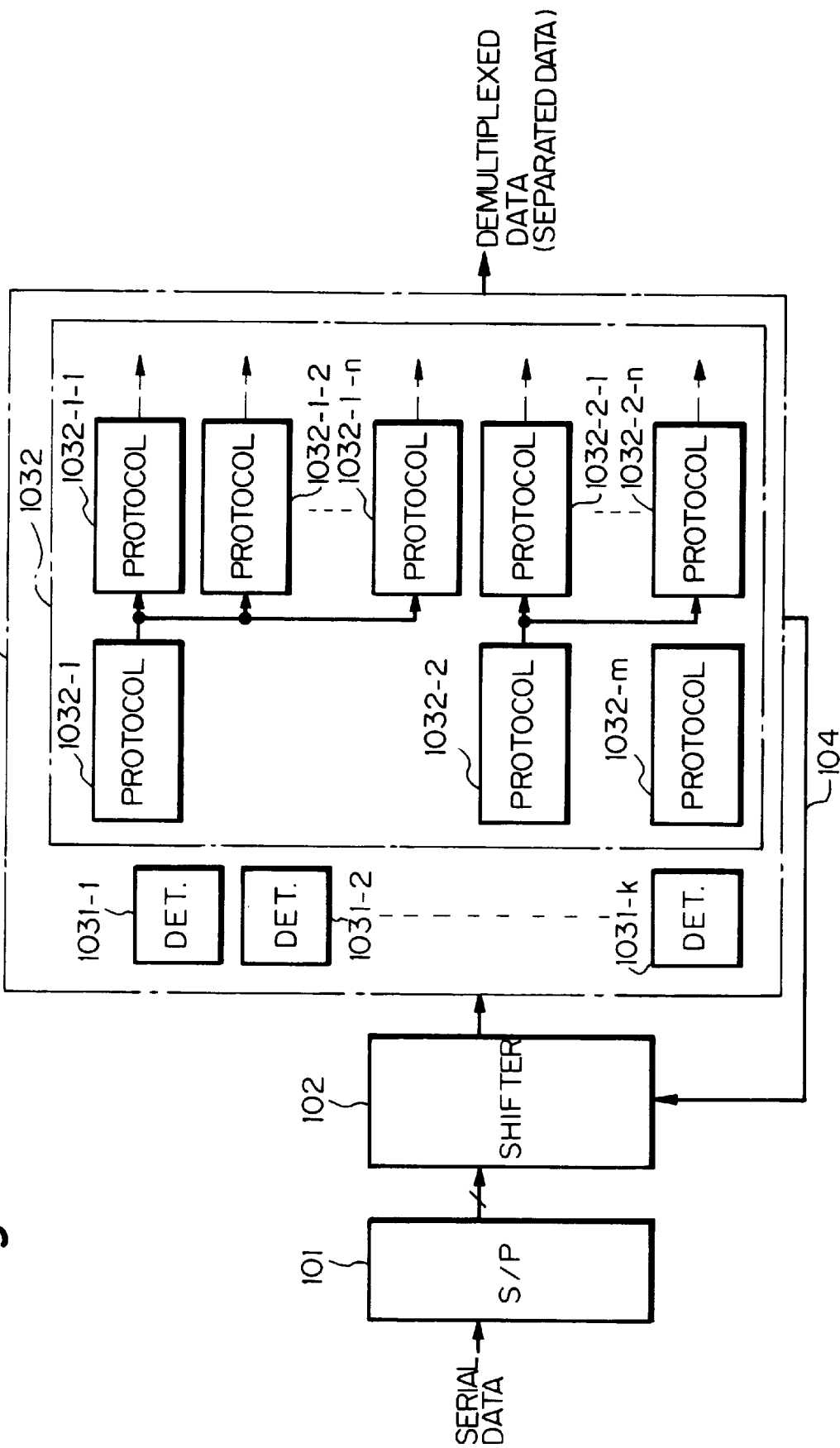
FIG. 1 is a block circuit diagram illustrating a first prior art data demultiplexing apparatus.

In FIG. 1, which illustrates a prior art data demultiplexing apparatus formed by hardware (see: JP-A-4-207728), in the case of serial data transmission, a serial-to-parallel converter 101 converts serial data into parallel data which is then input to a shifter 102 for changing a shift amount in accordance with protocol information that conforms to the framing rule.

Then, the output signal of the shifter 102 is input to a protocol analyzing/data separating section 103 for detecting synchronization bits assigned by the framing rule and transmitting the bit shift amount 104 thereof to the shifter 102. The protocol analyzing/data separating section 1032 is formed by bit synchronism detectors 1031-1, 1031-2, ..., 1031-k, and a protocol processing section 1032. The protocol processing section 32 is hierarchically configured to detect a bit string to a synchronization pattern at high speed. That is, the protocol processing section 32 is constructed by protocol processing units 1032-1, 1032-2, ..., 1032-m, 1032-1-1, 1032-1-2, ..., 1032-1-n, 1032-2-1, ..., 1032-2-n, and so on.

For data demultiplexing conforming to the H.221 Standard and using, for example, 2B channels of an ISDN, in order to test 16-bit data, 16 shifter units are required as the shifter 102, and a hierarchical comparator configuration is also required. Additionally, for making a protocol decision after detecting a synchronization bit, a state machine has to be constructed to control the number of input bits of the shift register 102 in accordance with the framing rule determined by the protocol.

In the demultiplexing apparatus of FIG. 1, bit synchronism detectors 1031-1, 1031-2, ..., 1031-k and the protocol analyzing/bit separating section 103 are indispensible. Also, the protocol processing units have to be hierarchically configured. As a result, the hardware inevitably will become bulky.

Additionally, if a new framing pattern is assigned to the protocol analyzing/bit separating section 103, an extra state transition has to be added to the state machine for deciding the input operation of the shift register 102, so that the time for responding to a new protocol has to be modified to a large extent, and a number of work steps required for this modification will be by far longer.

Figure 2:
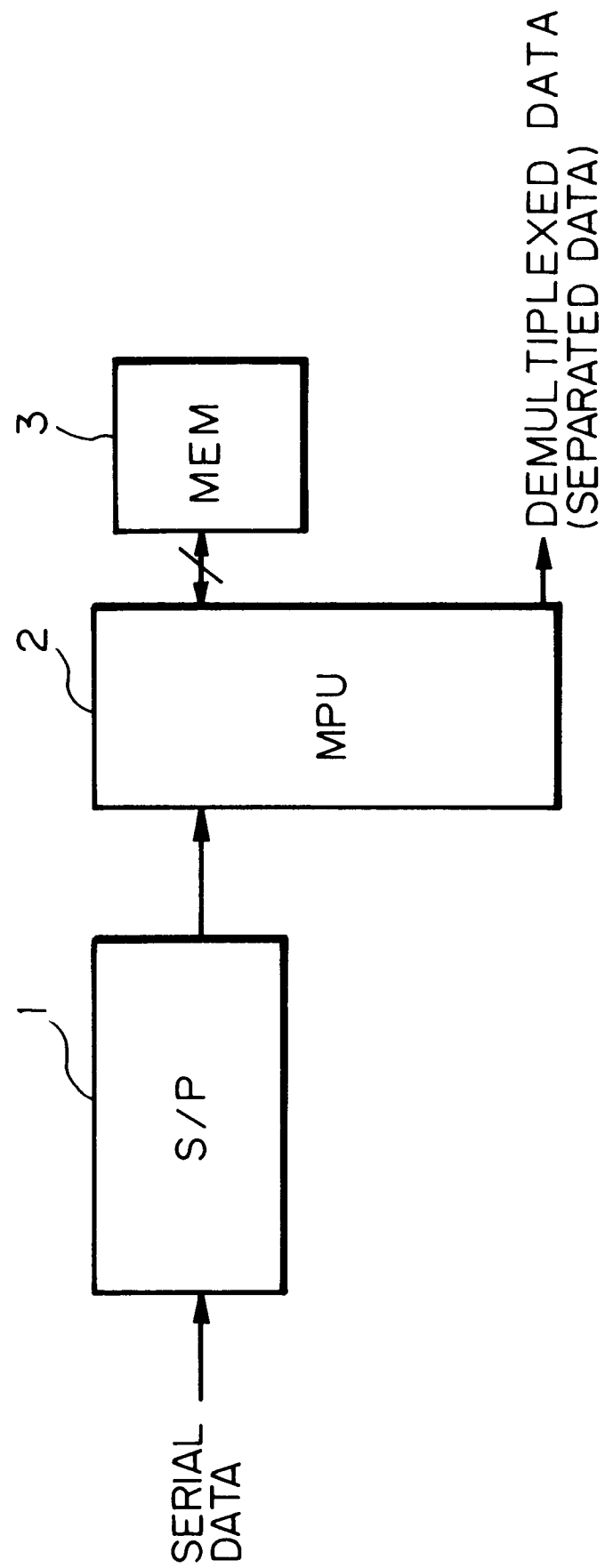
FIG. 2 is a block circuit diagram illustrating a second prior art data demultiplexing apparatus.

In FIG. 2, which illustrates a second prior art data demultiplexing apparatus by software, a serial-to-parallel converter 1 converts serial data into parallel data which is then input to a microprocessor 2 which is connected to a memory 3.

The operation of the microprocessor 2 of FIG. 2 is explained next with reference to FIG. 3. Here, assume that an 80 octet data (multiframe) of one B-channel of an ISDN is used as a framing unit to conform to the H.221 Standard as shown in FIG. 4 where FAS shows a frame alignment signal for synchronism detection and BAS shows a bit rate allocation signal for switching each sub-multiframe under the control of the BAS.

First, referring to step 301, one octet data is fetched. Then, the operation at step 301 is repeated by step 302 Lo fetch 80 octet data (one multiframe).

Next, at step 303, a value i is caused to be 1.

Next, at step 304, it is determined whether or to a synchronization pattern defined by FAS is detected in the subchannel i. As a result, if the synchronization pattern FAS is not detected, the control proceeds to step 305, while, if the synchronization pattern FAS is detected, the control proceeds to step 308.

Steps 305 and 306 repeat the operation at step 304 until such a synchronization pattern FAS is detected. Note that since the B-channel includes eight subchannels on the ISDN, a total of eight such detecting operations have to be carried out in the worst possible case. If such a synchronization pattern FAS is not detected in the eight detecting operations, the control proceeds to step 308 which carries out a synchronization error processing operation, and then, proceeds to step 312.

Steps 304, 305 and 306 constitute a synchronism detection phase. As shown in FIG. 4, the synchronization pattern FAS is an 8-bit pattern. Therefore, at least a total of seventeen instruction cycles including eight data input operations (step 304), eight arithmetic operations (step 305) and eight comparison operations (step 306) have to be carried out. Also, such a synchronism detection operation will be carried out in all of the 80-octet data. Then, a total of 17×8(bits)×80=13,600 instruction cycles are required.

On the other hand, once a synchronization pattern FAS is detected at step 304, the control proceeds to steps 308 through 311 which constitute a separation phase.

At step 308, the protocol pattern is analyzed to obtain a framing rule, and at step 309, a bit separation pattern is drawn in accordance with the obtained framing rule. Then, at step 310, the data is actually separated by a shift operation in accordance with the bit separation pattern. Then, at step 311, the separated data is output. Then, the control proceeds to step 312.

In the separation phase constituted by steps 308 through 311, one data read operation and four bit mask and shift operations are required at most for a 1 byte data. This means 80(read)+2(mask/shift)×4×80=720 instruction cycles are required for 80-octet data.

Figure 3:
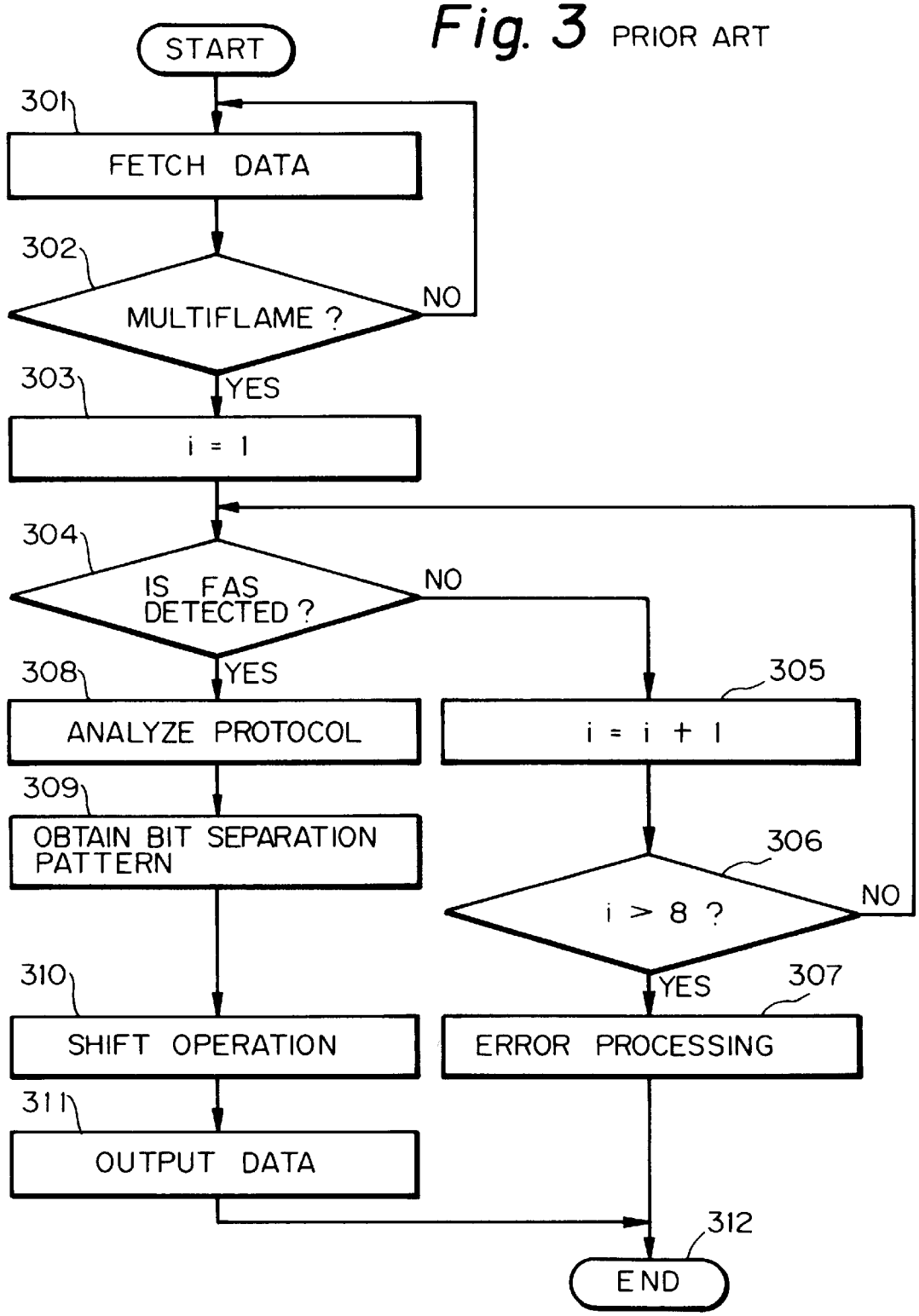
FIG. 3 is a flowchart showing the operation of the microprosessor of FIG. 2.
Figure 4:
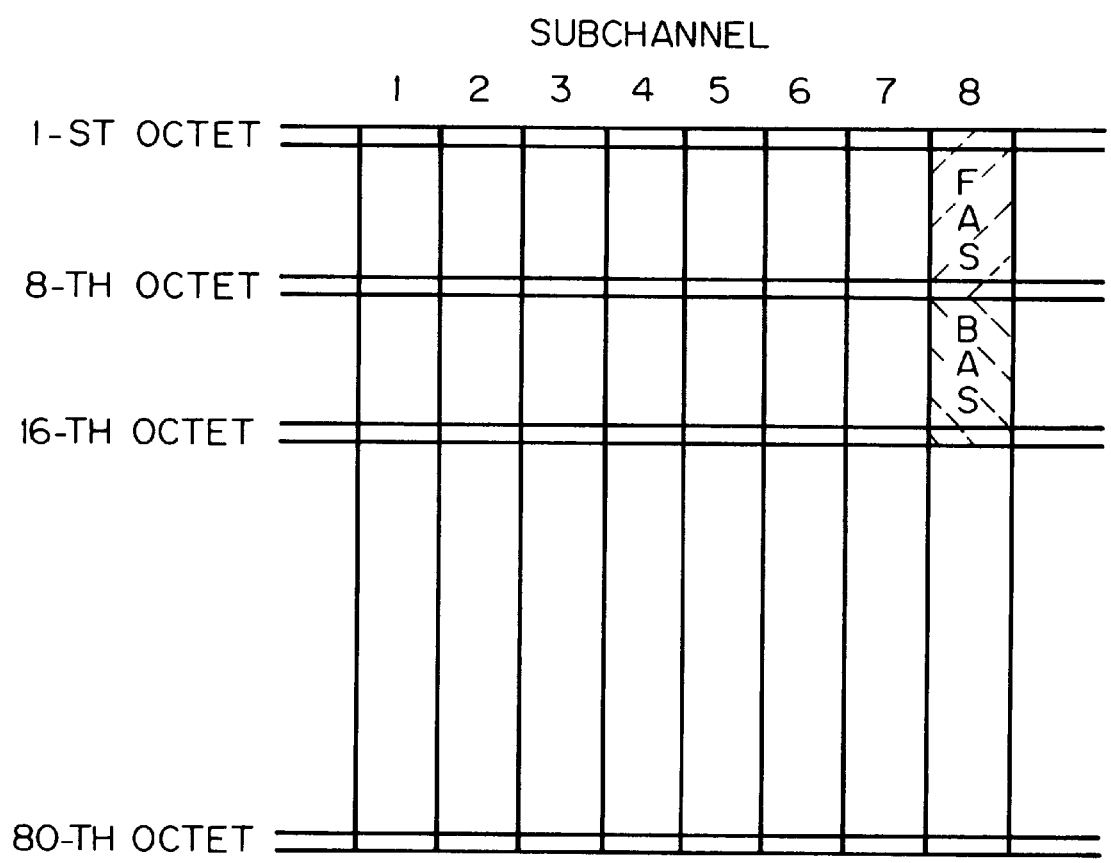
FIG. 4 is a table showing a subchannel configuration of the B-channel of an ISDN.

In the apparatus of FIG. 2 using the flowchart of FIG. 3, the operation will exhibit an enhanced level of adaptability and flexibility and provide ease of maintenance and a reduced time for development by far greater than the apparatus of FIG. 1.

The apparatus of FIG. 2 using the flowchart of FIG. 3, however, is accompanied by the problem of involving as many as 13,600 instruction cycles for a synchronism detection phase and also 720 instruction cycles per octet data for a separation phase after the synchronism detection phase, which can be processed only by means of a highly efficient processor, although the number of instruction cycles may be reduced to a certain extent in the initial synchronism detection phase on the basis of empirical detecting procedures.

In FIG. 5, which illustrates an embodiment of the data demultiplexing apparatus according to the present invention, a bit separation auxiliary circuit 4 is added to the element of FIG. 2, and a microprocessor 2' is provided instead of the microprocessor 2 of FIG. 2. In FIG. 5, attention is paid to the framing rules for data demultiplexing. Namely, the data demultiplexing operation is carried out by a hardware section and a software section, and the patterns of appearance of framing rules are divided into groups which are combined to draw out a shift amount held in a lookup table read-only memory (LUT ROM), so that the hardware section operates shifters in accordance with the drawn out value, whereas the software section actually carries out a data demultiplexing.

The bit separation auxiliary circuit 4 of FIG. 5 is illustrated in FIG. 6. Note that, a flowchart of the operation of the microprocessor 2' is illustrated within the block thereof. Parallel data generated from the serial-to-parallel converter 1 is transmitted via the microprocessor 2' to the memory 3, so that the memory 3 temporarily stores the parallel data therein.

In the bit separation auxiliary circuit 4, a data shift register 41 receives data from the memory 3. A correction register 42 sets a shift correction amount on the transmission path to the data shift register 41 in accordance with a shift correction amount information from the microprocessor 2'. A framing rule register 43 stores a framing rule determined by the microprocessor 2', and a counter 44 carries out a counting operation in accordance with the framing rule stored in the framing rule register 43. An LUT ROM 45 receives the output of the counter 44 as an address to generate a selection signal which is transmitted to a data selector 46. The data selector 46 distributes the output data of the data shift register 41 among a plurality of shift registers 47-1, 47-2, . . . , 47-X in accordance with the output data of the LUT ROM 45.

On the other hand, in the microprocessor 2', once a processing operation starts, at step 21, the microprocessor 2' sets appropriate initial values in the correction register 42 and the framing rule register 43.

Next, at step 22, the microprocessor 2' analyzes the data separated and allocated by the data shift register 41 and the data selector 46 among the shift registers 47-1, 47-2, . . . , 47-2. At this time, the correction amount of the correction register 42 is changed and retrieved to detect the correction amount on the transmission path.

Next, at step 23, the protocol is analyzed.

Finally, at step 24, a framing rule is set for the data in the framing rule register 43 in accordance with the framing information stored in the LUT ROM 45.

Now, ITU standard H.221 is explained with reference to FIGS. 7A, 7B, 8A and 8B where "A" stands for audio data, and "V" stands for video data, and each affixed number denotes the order of data in the bit string.

More specifically, FIGS. 7A and 7B show typical bit arrangements using 2B channels of an ISDN, where audio data is framed in accordance with the H.221 standard where low speed data (LSD) is 1,200 bps (G.722) and multi-layered protocol (MLP) is 4 kbps (G.722). Also, FIGS. 8A and 8B show typical bit arrangements using 2B channels of an ISDN by switching G.722 of FIGS. 7A and 7B to G.728 (ITU Standard).

From the viewpoint of the 2B initial channel as shown in FIGS. 7A (G.722), 8A (G.728) and the like (G.711), bit slice patterns can be classified into 26 types as shown in FIG. 9, where types 1 to 9 show G.711 audio data formats for H.221, types 10 to 18 show G.722 audio data formats for H.221, and types 19 to 26 show G.711 audio data formals for H.221. By classifying appearing bit slice patterns in FIG. 9 for further patternization, the 26 bit slice patterns can be classified into six pattern types A, B, C, D, E and F as shown in FIG. 10 where "s1" stands for one of audio data and video data and "S2" stands for one of FAS, BAS and other control signals "L" and "M".

Figure 11:
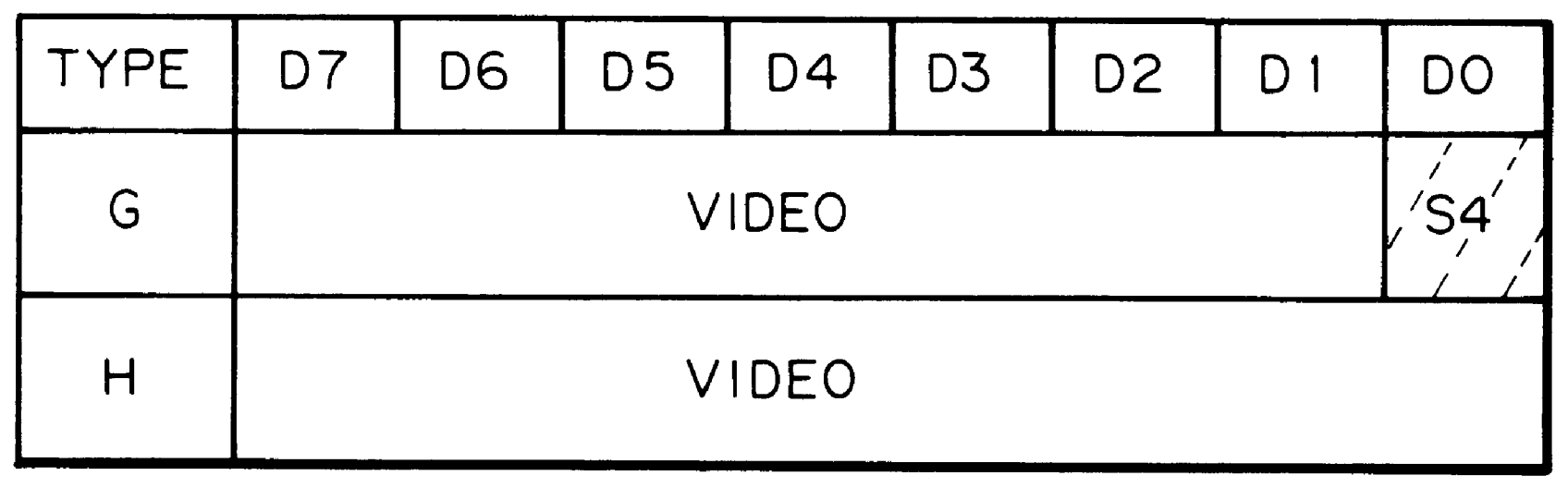

On the other hand, the bit patterns of the second channels as shown in FIGS. 7B and 8B are video signals, FAS or BAS, and hence, these bit patterns can be classified into two pattern types G and H as shown in FIG. 11 where "S4" stands for one of FAS and BAS.

Thus, the bits on the 2B channels can be classified into 12 pattern types A, B, . . . , H. of these pattern types, the combinations that are not allowed to appear by the H.221 standards can be deleted to finally obtain the following ten combinations of pattern types:

A+G, A+H, B+H, C+G, C+H, D+H, E+G, E+H, F+G and F+N.

Figure 12:
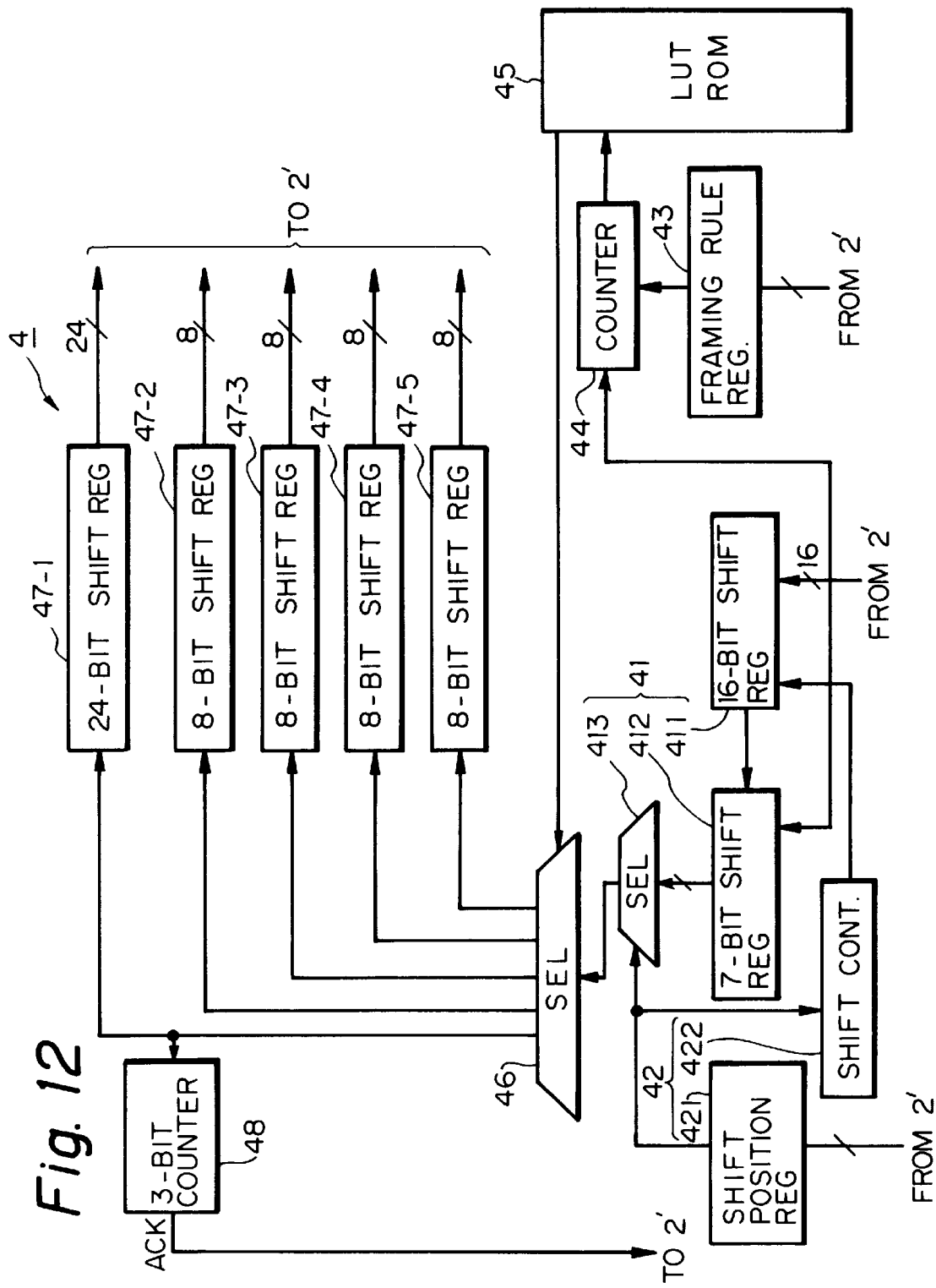
FIG. 12 is a detailed block circuit diagram of the bit separation anxiliary circuit of FIG. 6.

In order to respond to the bit patterns as shown in FIGS. 10 and 11, the bit separation auxiliary circuit 4 of FIG. 6 is constructed more concretely as illustrated in FIG. 12. That is, the data shift register 41 of FIG. 6 is constructed by a 16-bit shift register 411, a 7-bit shift register 412 and a selector 413. The correction register 42 of FIG. 6 is constructed by a shift position register 421 and a shift control circuit 422. Also, the group of the shift registers 47-1, 47-2, . . . , 47-X of FIG. 6 are a group of a 24-bit shift register 47-1, an 8-bit shift register 47-2, an 8-bit shift register 47-3, an 8-bit shift register 47-4 and an 8-bit shift register 47-5. Further, a 3-bit counter 48 is added to generates a carry signal as an acknowledgement signal ACK.

First, 1 octet (8 bits) of the initial channel and 1 octet (8 bits) of the second channel are combined and input to the 16-bit shift register 411. The 7-bit shift register 412 is arranged as head room for the overall bit shift configuration in order to correct the bit shift on the transmission path. Since 1 octet=8 bits for any ISDN, the head room of 7 bits is arranged. How many bits are to be shifted on the transmission path is determined when the microprocessor 2' writes a corresponding data in the shift position register 421. As a result, the shift control circuit 422 and the selector 413 specify the number of bits from the head room at which a data reading operation is started in accordance with the data of the shift position register 421.

With the above-described bit shift type, the amount of data separated from the leftmost end is stored in the LUT ROM 45 as a data for controlling the selector 46.

The separation type to be selected is set in the framing rule register 43 by the microprocessor 2'. The counter 44 starts counting, using the value set in the framing rule register 43 as an initial value, in synchronization with the shift operation of the 16-bit shift register 411. Thus, the read address of the LUT ROM 45 is updated.

The selector 46 separates its input data with a specified data length in accordance with the output signal of the LUT ROM 45, and allocates the separated data among the shift registers 47-1, 47-2, . . . , 47-5.

Of the separated data, those that can be easily controlled at the byte boundaries by the microprocessor 2' correspond to S1, S2, S3 and S4 of FIGS. 10 and 11. Thus, the 8-bit shift registers 47-2, 47-3, 47-4 and 47-5 are provided for the data S1, S2, S3 and S4, whereas the 24-bit shift register 47-1 is provided for the remaining data, i.e., video data and audio data.

When a data of 8 bits out of the 24-bits is formed in the 24-bit shift register 47-1, the 3-bit counter 48 generates an acknowledgement signal ACK and transmits it as a request for data take-over to the microprocessor 2'.

The procedure for separating data is divided into a synchronism phase and a separation phase in the same way as in the second prior art data demultiplexing apparatus.

In the synchronism phase, the microprocessor 2' detects synchronous patterns from the input data. To begin with, the bit separated pattern of the initial channel is processed as the pattern type C or E. In this case, the microprocessor 2' slices the data input to the data demultiplexing apparatus into data of 1 bit×8 for the subchannel and outputs it. Also, the microprocessor 2' checks the content of the shift registers 47-1, 47-2, . . . , 47-5 each time it transmits data to the data demultiplexing apparatus, in order to check if a synchronous pattern is appearing there.

With the separated patterns as shown in FIG. 10, S2 and S3 that store subchannel data can check the subchannel data sliced into 1-bit data. Therefore, only a pair of data can be checked for two subchannels at one time.

The data can be checked for all the subchannels, or subchannels 1 through 8, by repeating the above operation four times to obtained the overall shift amount. The obtained shift amount is then set in shift position register 421 for controlling the overall shift amount.

Then, in the separation phase, one of the ten separated patterns is selected as information obtained by the protocol and the data demultiplexing apparatus is notified of it. Thereafter, predetermined data are sent to the data demultiplexing apparatus to produce separated data.

It will now be appreciated that the microprocessor 2' carries out a data input operation, a data output operation and four shift operations in the synchronism phase, so that the operation of detecting synchronous bits in a sub-multi frame will involve only (1+1+4)×80=480 instruction cycles, which represents 4% of the instruction cycles required for the second prior art demultiplexing apparatus.

In the separation phase, on the other hand, a data input operation, a data output operation and a data separation pattern specifying operation are required in the worst case to make the operation of bit separation in a sub-multiframe will involve only (1+1+1)×80=240 instruction cycles, which represents 33% of the instruction cycles required for the second prior art demultiplexing apparatus.

The effect of the embodiment of FIG. 5 may be quantitatively expressed as a 4% reduction at most for the synchronism detecting section and a 33% reduction for the bit separation section if compared with the second prior art demultiplexing apparatus.

Figure 13:
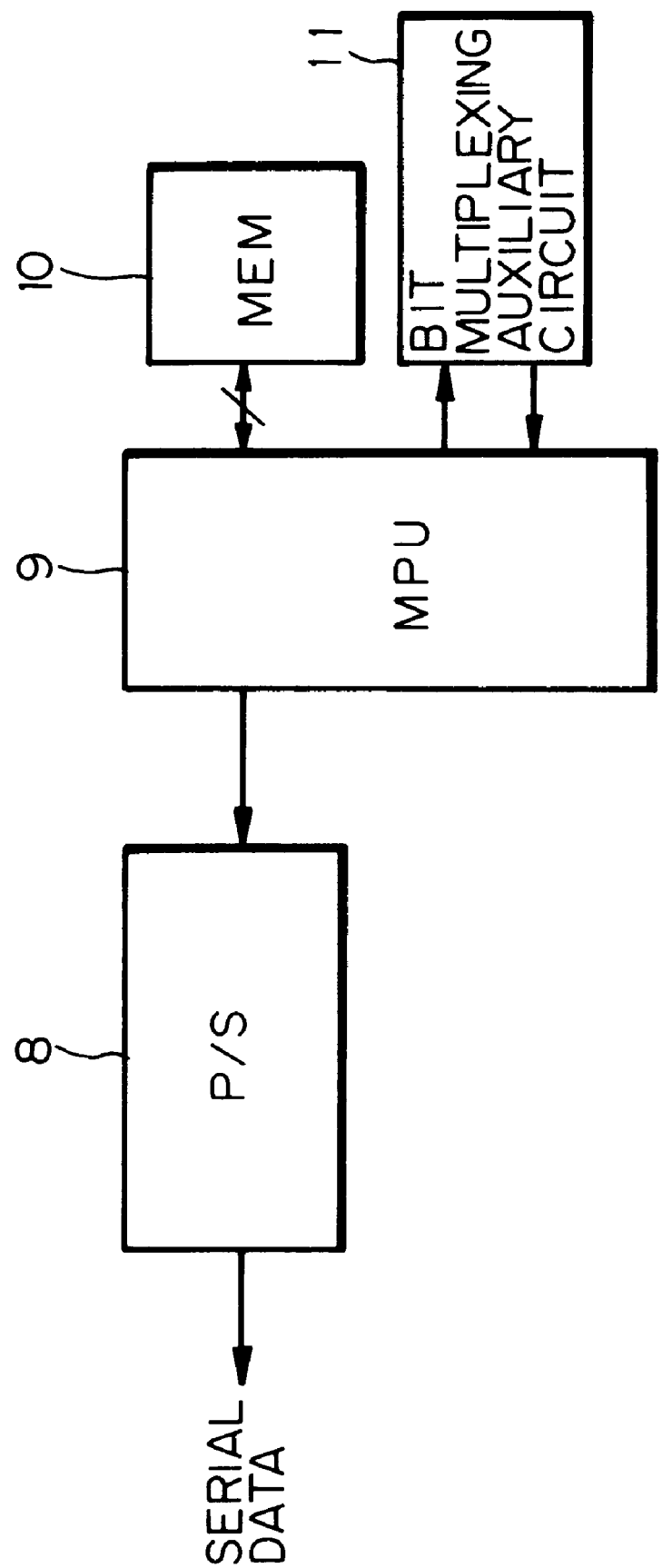
FIG. 13 is a block circuit diagram illustrating an embodiment of the data multiplexing apparatus according to the present invention.

In FIG. 13, which illustrates an embodiment of the data multiplexing apparatus according to the present invention, reference numeral 8 designates a parallel-to-serial converter, 9 designates a microprocessor, 10 designates a memory, and 11 designates a bit multiplexing auxiliary circuit. The bit multiplexing anxiliary circuit 11 is illustrated in detail in FIG. 14.

Figure 14:
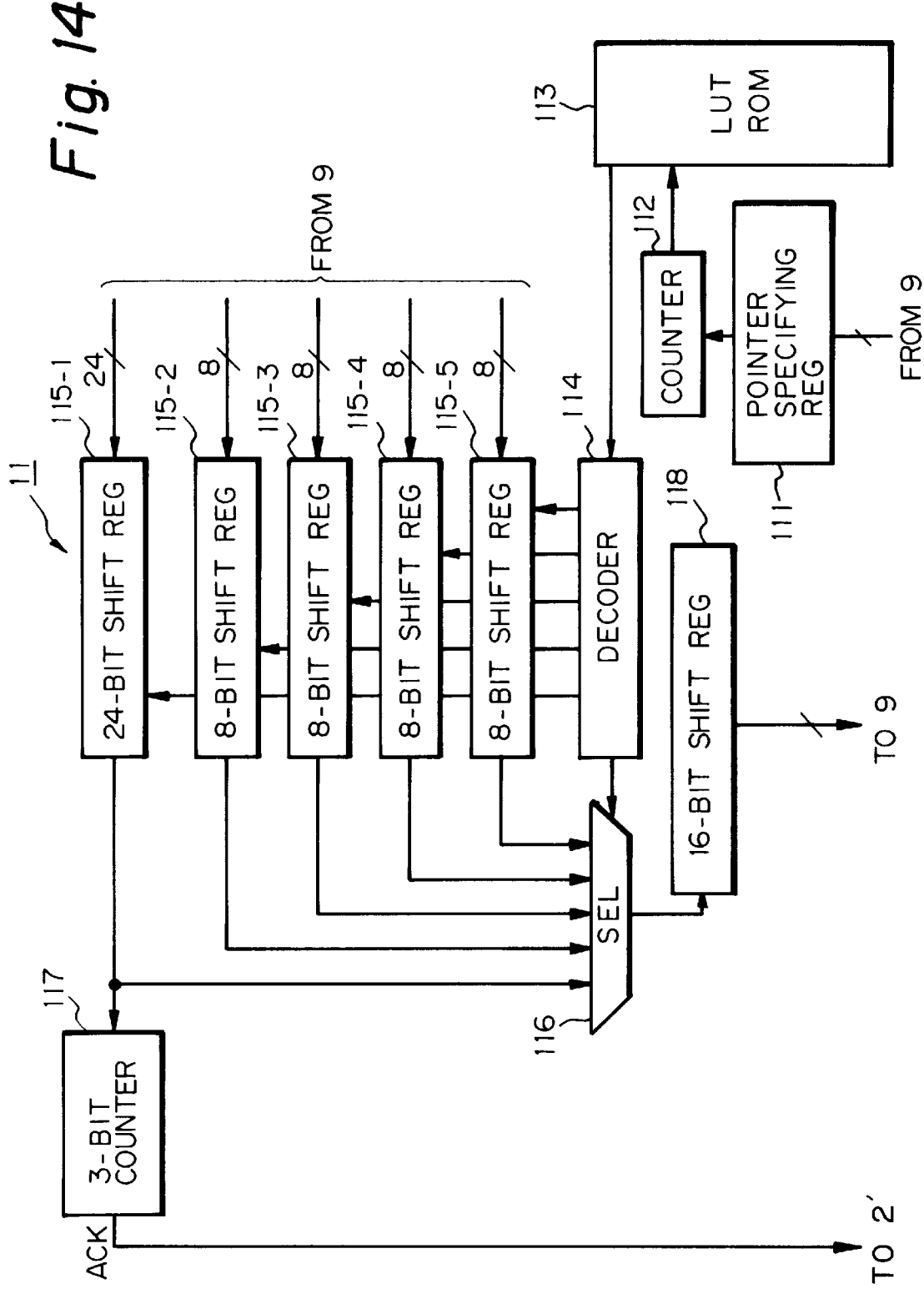
FIG. 14 is a detailed block circuit diagram of the bit multiplexing anxiliary circuit of FIG. 13.

In FIG. 14, the microprocessor 9 specifies a pattern for data to be multiplexed to a pointer specifying register 111 of a LUT ROM 113. In this case, the pattern is obtained by combining types A through F and types G and H of FIGS. 10 and 11.

The data to be multiplexed will be written into a 24-bit shift register 115-1 and 8-bit shift registers 115-2, 115-3, 115-4 and 115-5 by the microprocessor 9.

As the multiplexing operation starts, the data stored in the LUT ROM 118 as shift amounts representing bit patterns are sequentially read by a counter 112 at the address specified by the pointer specifying register 111.

The data read from the LUT ROM 113 are then entered into a decoder 114 for selecting and controlling one of the shift registers 115-1, 115-2, . . . , 115-5 to be operated, so that the selected register is driven to operate. Additionally, a data selector 116 selects the output data of the selected shift register to be multiplexed and transmits the data to a 16-bit shift register 118.

The number of data sent out from the 24-bit shift register 115-1 is counted by a 3-bit counter 117, which notifies the microprocessor 9 of each 8-bit shift and requests a new 8-bit data. when only software is used for data multiplexing and A and G pattern types of FIGS. 10 and 11 are selected, there are required:

a total of 15 instruction cycles including 4 instruction cycles for data reading, 5 instruction cycles for data masking (logical AND), 5 instruction cycles for shift operation, and 5 instruction cycles for bit synthesis (logical OR).

With the embodiment of FIGS. 13 and 14, on the other hand, there are required only:

a total of 9 instruction cycles including 4 instruction cycles for data reading, and 5 instruction cycles for data writing, representing 60% of those used for data multiplexing only by means of software.

Figure 15:
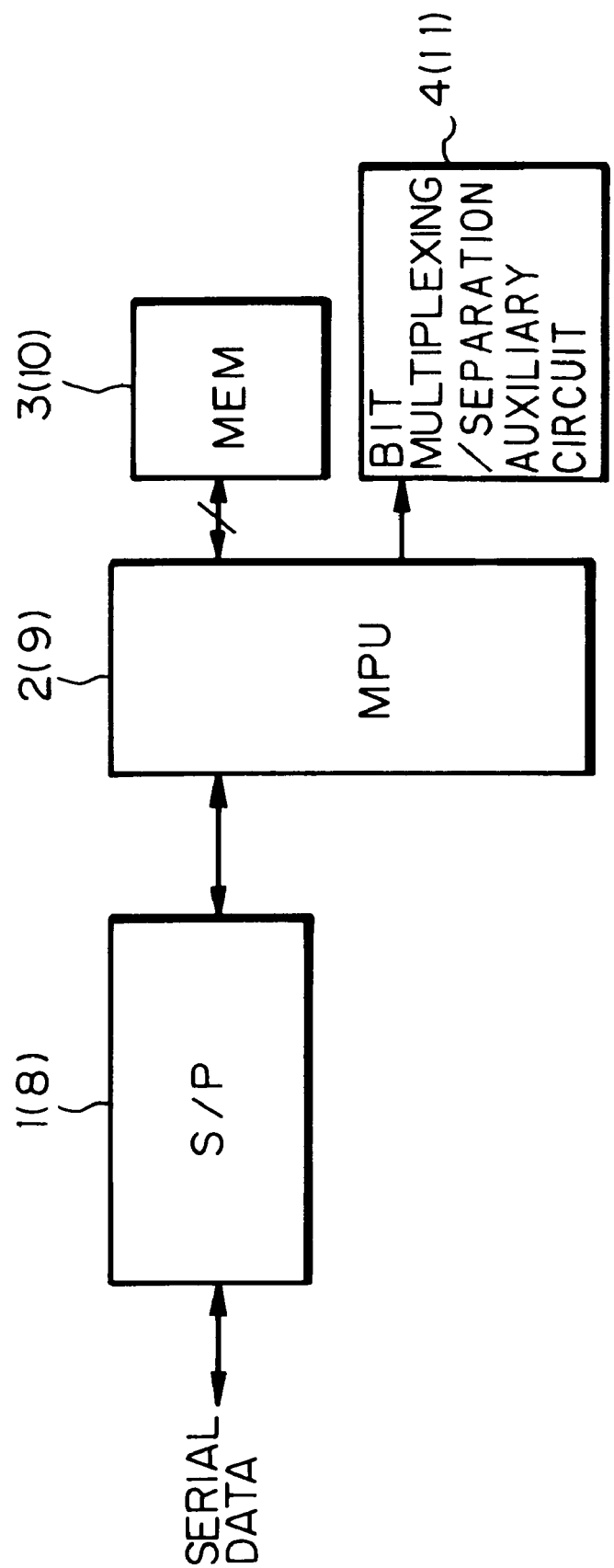
FIG. 15 is a block circuit diagram illustrating a data multiplexing/demultiplexing apparatus according to the present invention.
Figure 16:
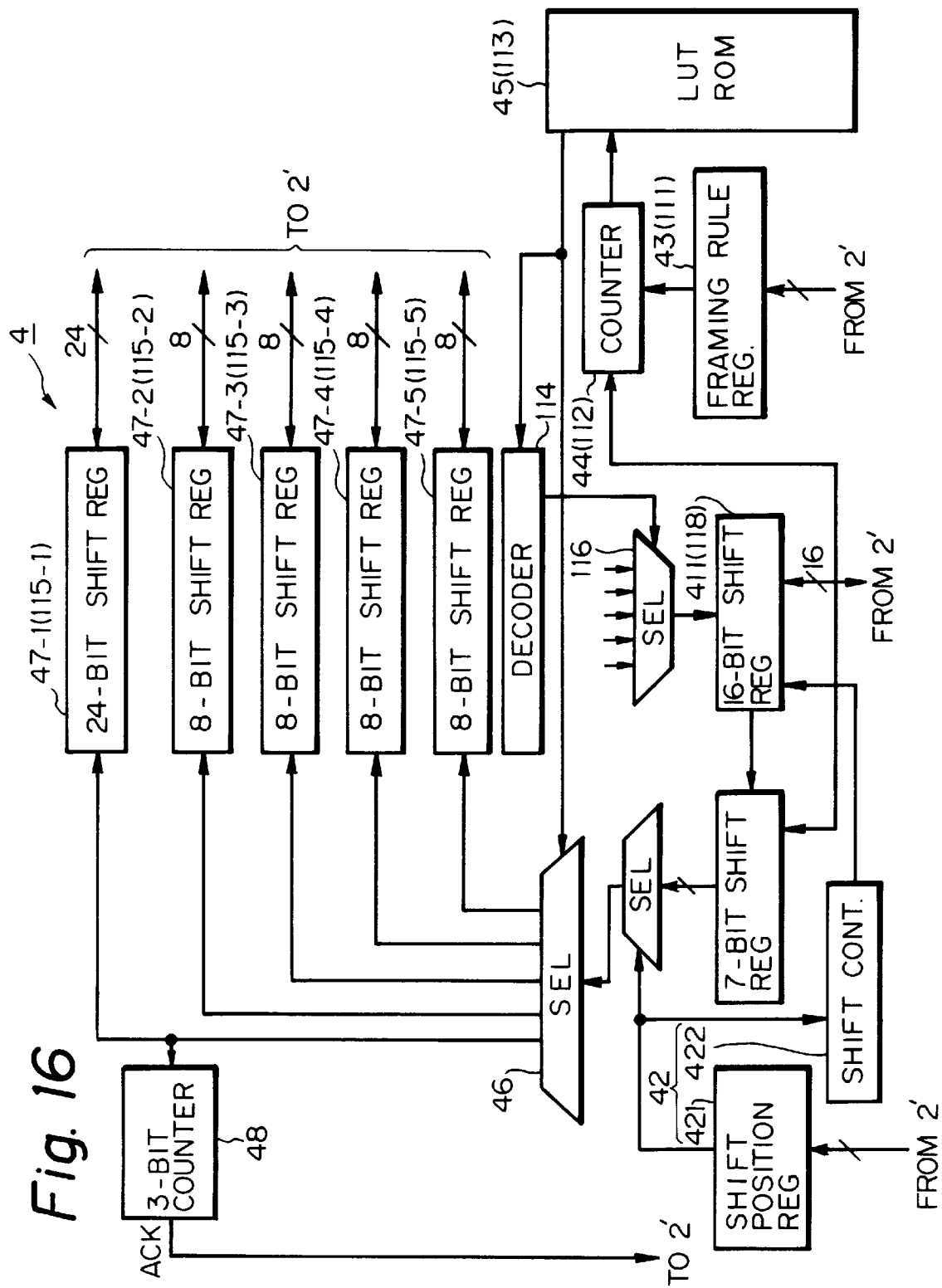
FIG. 16 is a detailed block circuit diagram of the bit multiplexing/separation circuit of FIG. 15.

Note that the data demultiplexing apparatus of FIG. 5 and the data multiplexing apparatus of FIG. 13 can be combined into a single data multiplexing/demultiplexing g apparatus as illustrated in FIG. 15. In FIG. 15, a serial-to-parallel converter 1(18) is duplex, and a bit multiplexing/separation anxiliary circuit 4(11) serves as the separation auxiliary circuit 4 of FIG. 5 as well as the multiplexing auxiliary circuit 11 of FIG. 11. The bit multiplexing/Separation auxiliary circuit 4(11) is illustrated in FIG. 16. In FIG. 16, the shift registers 47-1(115-1), 47-2(115-2), 47-3(115-3), 47-4 (115-4) and 47-5(115-5) are duplex, and the 16-bit shift register 411(118) is also duplex.

As explained above, according to the invention, since there are provided shift registers, optimized for a protocol,an LUT ROM for storing the data framing rule drawn out of the pattern of the protocol, and selectors to be switched by the data output from the LUT ROM and a microprocessor, the load of the software can be relieved without damaging the flexibility of the software system.

I claim:

1. A data multiplexing/demultiplexing apparatus comprising:

a serial-to-parallel converter for converting serial data into parallel data:

a microprocessor;

a memory for temporarily storing said parallel data by way of said microprocessor;

a data shift register, connected to said microprocessor, for inputting data from said memory by way of said microprocessor;

a correction register, connected to said data shift register and said microprocessor, for storing a shift correction amount on a transmission path of said data shift register said shift correction amount determined by said microprocessor;

a framing rule register, connected to said microprocessor, for storing a framing rule determined by said microprocessor;

a counter, connected to said framing rule register, for carrying out a counting operation in accordance with said framing rule and outputting an address information signal;

a look-up table ROM, connected to said counter, for outputting a selector selection signal in accordance with said address information signal;

a plurality of shift registers; and a data selector, connected between said data shift register and said plurality of shift registers and connected to said look-up table ROM, for distributing so output data of said data shift register among said plurality of shift registers in accordance with said selector selection signal, said microprocessor comprising:

means for analyzing data separated by said plurality of shift registers and performing a synchronism detecting operation and a protocol determining operation; and means for determining said framing rule of said framing rule register in accordance with a result of said protocol determining operation.

2. The apparatus as set forth in claim 1, wherein said serial-to-parallel converter, said data shift register and said plurality of shift registers are duplex, said apparatus further comprising:

a decoder, connected between said look-up table ROM and said plurality of shift registers, for selecting and controlling one of said plurality of shift registers in accordance with said selector selection signal; and an additional data selector, connected between said plurality of shift registers and said data shift register, said apparatus being adapted to synthesize data in accordance with said framing rule to generate multiplexed data.

3. A data demultiplexing apparatus comprising:

a serial-to-parallel converter for converting serial data into parallel data;

a processor for receiving said parallel data;

a memory for temporarily storing said parallel data by way of said processor;

a bit separation auxiliary circuit connected to said processor and including a data shift register for receiving said parallel data, a look-up table for storing a framing rule as a selection signal, and a selector, connected to said data shift register and plurality of shift registers, for allocating output data of said data shift register among said plurality of shift registers, said processor being controlled by programs so as to detect synchronism, analyze a protocol, and separate data in accordance with a framing rule.

4. A data multiplexing apparatus comprising:

a parallel-to-serial converter, a microprocessor connected to said parallel-to-serial converter;

a pointer specifying register, connected to said microprocessor, for storing a framing rule determined by said microprocessor;

a counter, connected to said pointer specifying register, for carrying out a counting operation in accordance with said framing rule and generating an address information signal;

a look-up table ROM, connected to said counter, for outputting a selector selection signal in accordance with said address information signal;

is a plurality of shift registers;

a decoder, connected between said look-up table ROM and said plurality of shift registers, for selecting and controlling one of said plurality of shift registers in accordance with said selector selection signal;

a selector, connected to said decoder and said plurality of shift registers, for selecting one of outputs of said plurality of shift register in accordance with said selector selection signal;

a data shift register, connected to said selector, for carrying out a shift operation by receiving an output signal of said selector, said apparatus being adapted to multiplex data in accordance with said framing rule and generate multiplexed data.

* * * * *